US012699959B2

(12) United States Patent
Appleton

(10) Patent No.: US 12,699,959 B2
(45) Date of Patent: Aug. 4, 2026

(54) INVENTORY MANAGEMENT SYSTEM AND METHOD USING SMART TAGS

(71) Applicant: Cameron Appleton, Stephenville, TX (US)

(72) Inventor: Cameron Appleton, Stephenville, TX (US)

( * ) Notice: Subject to any disclaimer, the term of this patent is extended or adjusted under 35 U.S.C. 154(b) by 311 days.

(21) Appl. No.: 18/124,766

(22) Filed: Mar. 22, 2023

(65) Prior Publication Data

US 2024/0320612 A1     Sep. 26, 2024

(51) Int. Cl.
G06Q 10/087     (2023.01)
G06K 7/10     (2006.01)
G06Q 50/02     (2024.01)

(52) U.S. Cl.
CPC ....... G06Q 10/087 (2013.01); G06K 7/10366 (2013.01); G06Q 50/02 (2013.01)

(58) Field of Classification Search
CPC ... G06Q 10/087; G06Q 50/02; G06K 7/10366
See application file for complete search history.

(56) References Cited

U.S. PATENT DOCUMENTS

| | | | |
|---|---|---|---|
| 10,163,071 B1 | 12/2018 | Quan | |
| 2003/0130883 A1* | 7/2003 | Schroeder | G06Q 10/04 |
| | | | 705/7.29 |

| | | | | |
|---|---|---|---|---|
| 2005/0075900 A1 | 4/2005 | Arguimbau | | |
| 2005/0099292 A1 | 5/2005 | Sajkowsky | | |
| 2011/0234371 A1 | 9/2011 | Linton | | |
| 2016/0042151 A1* | 2/2016 | Akdogan | ............... | B25J 19/023 |
| | | | | 700/240 |
| 2022/0058577 A1 | 2/2022 | Kimmel | | |

OTHER PUBLICATIONS (ISA/237) Written Opinion of the International Searching Authority.
(ISA/210) International Search Report.

* cited by examiner

*Primary Examiner* — Ariel J Yu
*Assistant Examiner* — Denisse Y Ortiz Roman
(74) *Attorney, Agent, or Firm* — Fogarty LLP

(57)     ABSTRACT

An inventory management system and method for managing inventory related to agriculture and farm animals utilizing smart tags are disclosed. The system comprises one or more containers, one or more smart readers, and a computing device in communication with the smart readers. Each container is associated with a smart tag. The smart reader is configured to wirelessly detect the smart tag associated with the containers. The computing device is configured to receive information related to the containers from the reader and detect the level of containers in the inventory. The computing device is further configured to enable a user to define a predefined level of container to automatically place an order for the containers, when the level of the container reaches the predefined level defined by the user. The computing device is configured to automatically place the order for containers when the inventory reaches the predefined level.

9 Claims, 1 Drawing Sheet

100

100
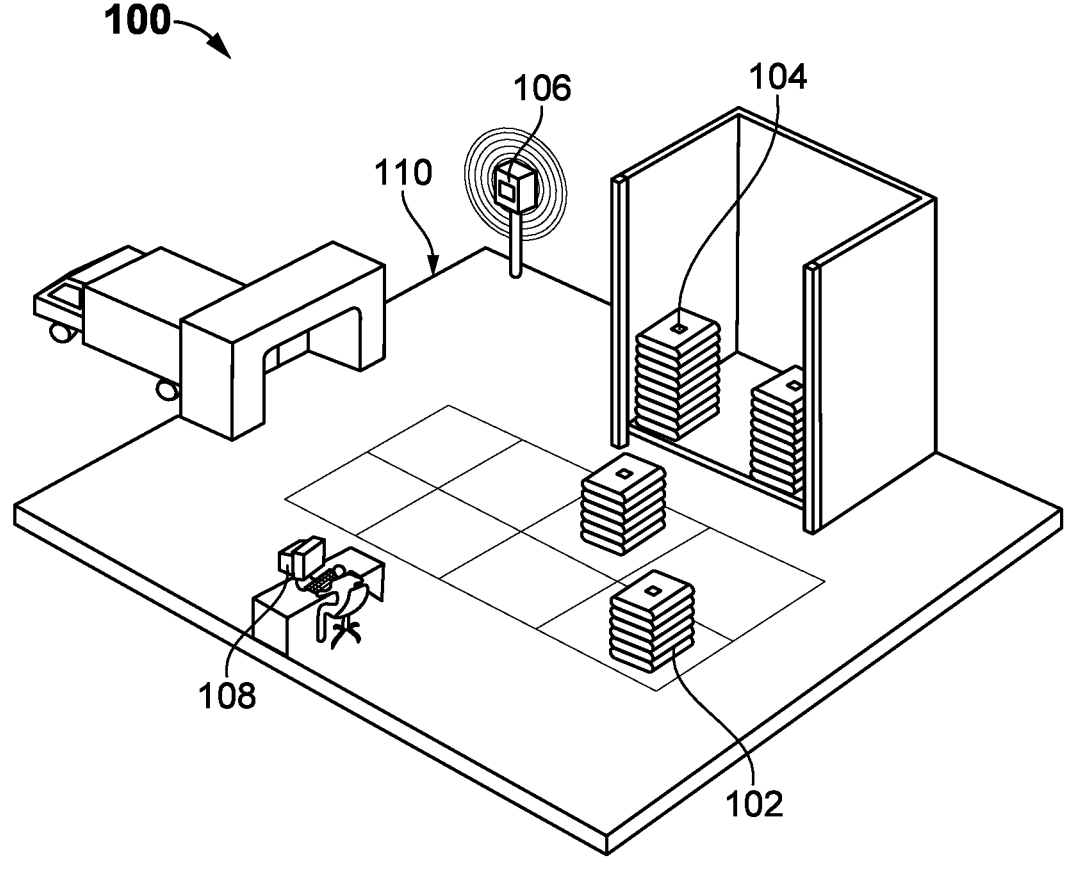

INVENTORY MANAGEMENT SYSTEM AND METHOD USING SMART TAGS

TECHNICAL FIELD

The present invention generally relates to inventory management system and method. More specifically, the present invention relates to an inventory management system and method for managing inventory related to agriculture and farm animals using smart tags.

BACKGROUND

Inventory tracking system is a keystone for successful farming today. Such system provides a systematic approach to proper and effective management of inventory. With optimal inventory management, farming companies can track everything from seed to sale in real-time and save a lot of cost and effort in overall farm management. The inventory tracking system regularly updates inventory levels and keeps track of inventory availability of all stock locations. It helps companies in keeping track of inventory to avoid several inventory-related issues such as overstocking and out-of-stock issues.

In farming companies, the process of tracking and monitoring consumable inventory in agriculture operations plays a vital role. The inventory tracking helps to track real-time number of products available at the inventory to easily avoid out-of-stock issues. Further, the inventory tracking helps to replenish the inventory in the farms without any delay. An effective inventory control maintains accurate records of both incoming and outgoing stock.

In the past, inventory tracking is often done manually, which could be time-consuming and error-prone. Modern businesses are increasingly using RFID technology to automate the inventory management process. However, none of the existing systems and methods provide a solution for keeping track of pharmaceutical inventory on the farm. In addition, as more robotic dairies are built the need for inventory management on farms has increased in recent times.

Therefore, there is a need for a system and method for tracking and managing inventory related to agriculture and farm animals utilizing smart tags. Also, there is a need for a system and method that helps in placing order to suppliers, or vendors to replenish the inventory. Further, there is a need for a system and method that helps to stabilize the food chain for a rapidly growing population.

SUMMARY

The present invention discloses an inventory management system and method for managing inventory related to agriculture and farm animals. Also, the present invention discloses an inventory management system and method for automatically placing orders to vendors to replenish the inventory.

According to the present invention, the system comprises one or more containers, one or more smart readers, and a computing device in communication with the smart readers. Each container is associated with a smart tag. The smart tag is an ultra-high frequency type radio-frequency identification (UHF RFID) tag. Each container comprises a label containing information related to the respective container. In one embodiment, the smart tag is embedded in the label of each container.

The smart reader is configured to wirelessly detect the smart tag associated with the containers. The smart reader comprises a radio-frequency identification (RFID) reader. The RFID reader is disposed proximal to the containers in the inventory. The RFID reader is configured to send the information received from the smart tag associated with each container to the computing device. The system further comprises a database for storing information related to the inventory. In one embodiment, the database is an integral part of the computing device.

The computing device is configured to receive information related to the containers from the reader and detect the level of containers in the inventory. The computing device is further configured to enable a user to define a predefined level of container to automatically place an order for the containers when the level of the container reaches the predefined level defined by the user. The computing device is further configured to automatically place order for containers when the inventory reaches the predefined level. In one embodiment, the computing device is at least one of a computer, a smart relay or a programmable logic controller (PLC). The data available on the computer may also be available on an application available on smart phones. The present invention may also be used for keeping track of household pet pharmaceuticals. The present invention for example the software may be integrated on pharmaceutical herd management software to monitor trends more accurately.

The above summary contains simplifications, generalizations and omissions of detail and is not intended as a comprehensive description of the claimed subject matter but, rather, is intended to provide a brief overview of some of the functionality associated therewith. Other systems, methods, functionality, features and advantages of the claimed subject matter will be or will become apparent to one with skill in the art upon examination of the following figures and detailed written description.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which:

FIG. 1 shows an environment of an inventory management system in an embodiment of the present invention.

DETAILED DESCRIPTION OF EXAMPLE EMBODIMENTS

A description of embodiments of the present invention will now be given with reference to the Figures. It is expected that the present invention may be embodied in other specific forms without departing from its spirit or essential characteristics. The described embodiments are to be considered in all respects only as illustrative and not restrictive.

FIG. 1 exemplarily illustrates an environment 100 of an inventory management system, according to an embodiment of the present invention. The system comprises a plurality of containers 102 disposed at the inventory 110. In one embodiment, inventory 110 is a pharmaceutical inventory of a farm.

In one embodiment, the containers 102 are pharmaceutical products related to agriculture and farm animals.

Each container 102 is associated with a smart tag. The smart tag is an ultra-high frequency type radio-frequency identification (UHF RFID) tag 104. Each container I 02 comprises a label containing information related to the respective container I 02. In one embodiment, the smart tag is embedded in the label of each container I 02. The system further comprises one or more smart readers configured to wirelessly detect the smart tag associated with the container 102. The smart reader comprises a radio-frequency identification (RFID) reader 106.

The smart tag comprises a unique identifier capable of being read by the RFID reader 106. The RFID reader 106 is disposed proximal to the containers 102 at the inventory 110. The smart tag includes an internal antenna to receive a signal emitted by the RFID reader 106. The signal from the RFID reader 106 causes the smart tag to generate and transmit a coded signal to the RFID reader 106. The RFID reader 106 is configured to decode the signal comprising information related to the container 102. The RFID reader 106 is further configured to send the information received from the smart tag associated with each container 102 to a computing device.

The system further comprises the computing device in communication with the RFID reader 106. The computing device is configured to receive information related to the containers 102 from the RFID reader 106 and detect the level of containers 102 in the inventory 110. The computing device is further configured to enable a user to define a predefined level of container 102 to automatically place an order for the containers 102, when the level of the container 102 reaches the predefined level defined by the user. The predefined level refers to a range of number of containers 102 at the inventory 110. The computing device is further configured to automatically place the order for one or more containers 102 to one or more vendors when the inventory 110 reaches the predefined level.

In one embodiment, the computing device is any one of a computer 108, a smart relay, and a programmable logic controller (PLC). The system further comprises a database for storing information related to the inventory 110. In one embodiment, the database is an integral part of the computing device. The database further comprises information related to the pharmaceutical inventory of the farm. The computing device has access to the database comprising information related to the pharmaceutical inventory of the farm.

The computing device is further configured to enable the user to define a predefined level of animals in the farm to automatically place the order for one or more containers 102 to one or more vendors when the inventory 110 reaches the predefined level of animals. In one embodiment, the computing device enables the user to predefine one or more vendors as preferred vendors. The computing device is configured to place the order from the vendors defined by the user.

Advantageously, the system and method of the present invention are used to keep track of consumable inventory on agriculture and farm animals utilizing RFID technology. The system enables to prevent the shortage of products in the inventory, which provides a quality life to the animals. The system tracks the inventory for placing orders to the vendors, automatically, to replenish the inventory. Further, the system and method help to stabilize the food chain for a rapidly growing population.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular system, device or component thereof to the teachings of the disclosure without departing from the essential scope thereof. Therefore, it is intended that the disclosure not be limited to the particular embodiments disclosed for carrying out this disclosure, but that the disclosure will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope of the disclosure. The described embodiments were chosen and described in order to best explain the principles of the disclosure and the practical application, and to enable others of ordinary skill in the art to understand the disclosure for various embodiments with various modifications as are suited to the particular use contemplated.

The invention claimed is:

1. An inventory management system to manage inventory related to agriculture and farm animals and to automatically place orders to vendors to replenish the inventory, comprising:

at least one smart tag container to contain the inventory;

at least one smart tag configured to be respectively associated with the at least one smart tag container, wherein the at least one smart tag is an ultra-high frequency (UHF) type radio-frequency identification (RFID) tag;

at least one smart tag label configured to be respectively associated with the at least one smart tag container and configured to include information relating to the at least one smart tag container, wherein the at least one smart tag is configured to be embedded in the at least one smart tag label;

a smart tag reader which is configured to wirelessly read a unique identifier from the at least one smart tag; and a computing device configured to communicatively and operably couple with the smart tag reader and with a smart phone application configured to execute on a smart phone, the computing device further configured to perform operations that comprise:

receive, from the smart phone application, information for one or more preferred vendors input to the smart phone by a user;

receive, from the smart phone application, a predefined level of animals to smart tag containers input to the smart phone by the user;

receive, from the smart tag reader, at least one unique identifier respectively associated with the at least one smart tag container that retains current inventory;

determine whether a current level of animals to smart tag containers reached the predefined level of animals to smart tag containers, based, at least in part, on the at least one unique identifier received from the smart tag reader, a herd size obtained at least in part from a robotic device configured to monitor trends in a robotic farm environment, and the predefined level of animals to smart tag containers; and in response to a determination the current level of animals to smart tag containers reached the predefined level of animals to smart tag containers, automatically order one or more smart tag containers from the one or more preferred vendors.

2. An inventory management system to manage inventory related to agriculture and farm animals and to automatically place orders to vendors to replenish the inventory as in claim 1, wherein the at least one smart tag container retains a pharmaceutical product related to agriculture and farm animals.

3. An inventory management system to manage inventory related to agriculture and farm animals and to automatically place orders to vendors to replenish the inventory as in claim 1, wherein the inventory management system is configured to operate at least in part at a farm.

4. An inventory management system to manage inventory related to agriculture and farm animals and to automatically place orders to vendors to replenish the inventory as in claim 1, wherein the smart tag reader is positioned proximal to the at least one smart tag container.

5. An inventory management system to manage inventory related to agriculture and farm animals and to automatically place orders to vendors to replenish the inventory as in claim

1, wherein the inventory management system further comprises a database to store information related to the inventory.

6. An inventory management system to manage inventory related to agriculture and farm animals and to automatically place orders to vendors to replenish the inventory as in claim 5, wherein the database is further configured to be integral with the computing device.

7. An inventory management system to manage inventory related to agriculture and farm animals and to automatically place orders to vendors to replenish the inventory as in claim 1, wherein the computing device is configured to perform further operations to determine whether the current level of animals to smart tag containers reached the predefined level of animals to smart tag containers, wherein the further operations comprise:

calculate a current level of animals to smart tag containers based on the herd size divided by a current quantity of the at least one smart tag container detected based on the at least one unique identifier;

compare the current level of animals to smart tag containers to the predefined level of animals to smart tag containers; and in response to a determination the current level of animals to smart tag containers is less than or equal to the predefined level of animals to smart tag containers, automatically order one or more smart tag containers from the one or more preferred vendors.

8. An inventory management system to manage inventory related to agriculture and farm animals and to automatically place orders to vendors to replenish the inventory as in claim 1, wherein the computing device is further configured to be integrated with a pharmaceutical herd management system.

9. An inventory management system to manage inventory related to agriculture and farm animals and to automatically place orders to vendors to replenish the inventory as in claim 8, wherein the computing device includes a smart relay or a programmable logic controller.

* * * * *